United States Patent
Li et al.

(10) Patent No.: US 12,520,042 B2
(45) Date of Patent: Jan. 6, 2026

(54) CAMERA AND ELECTRONIC DEVICE IMPLEMENTING IMAGE STABILIZATION USING IMAGE SENSOR DISPLACEMENT

(71) Applicant: HUAWEI TECHNOLOGIES CO., LTD., Guangdong (CN)

(72) Inventors: Cunying Li, Dongguan (CN); Kun Ran, Dongguan (CN); Shusheng Peng, Dongguan (CN); Linghui Zeng, Shenzhen (CN); Lin Yang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 119 days.

(21) Appl. No.: 18/562,335

(22) PCT Filed: May 13, 2022

(86) PCT No.: PCT/CN2022/092699
§ 371 (c)(1),
(2) Date: Nov. 20, 2023

(87) PCT Pub. No.: WO2022/242561
PCT Pub. Date: Nov. 24, 2022

(65) Prior Publication Data
US 2024/0251167 A1    Jul. 25, 2024

(30) Foreign Application Priority Data

May 20, 2021 (CN) .................... 202110552856.X (51) Int. Cl.
*H04N 23/68* (2023.01)
*G03B 13/36* (2021.01)
*H04N 23/54* (2023.01)

(52) U.S. Cl.
CPC .......... *H04N 23/687* (2023.01); *G03B 13/36* (2013.01); *H04N 23/54* (2023.01)

(58) Field of Classification Search
CPC ...... H04N 23/687; H04N 23/54; H04N 23/55; H04N 23/57; H04N 23/50; G03B 13/36;
(Continued)

(56) References Cited

U.S. PATENT DOCUMENTS 8,248,497 B2 * 8/2012 Tanimura .................. G03B 5/00
                                            348/208.99
10,582,100 B1 3/2020 Ba-Tis et al.
(Continued)

FOREIGN PATENT DOCUMENTS

CN          112788246 A       5/2021

*Primary Examiner* — Timothy J Henn (57) ABSTRACT

A camera and an electronic device are provided to improve image stabilization. The camera provides an integrated circuit board that includes a fastening assembly and a movable assembly. The movable assembly includes an image sensor carrying assembly, one or more suspended beam assemblies, and one or more flexible assemblies. The image sensor carrying assembly is configured to carry an image sensor. The one or more suspended beam assemblies are configured to fasten a first magnetic driver group or a second magnetic driver group. The one or more suspended beam assemblies and the image sensor carrying assembly are connected to the fastening assembly through the one or more flexible assemblies. The entire circuit board is compact in structure, and the first magnetic driver group or the second magnetic driver group may be directly fastened to the circuit board to drive the image sensor.

20 Claims, 7 Drawing Sheets

(58) Field of Classification Search
CPC ... G03B 30/00; G03B 2205/0038; G03B 5/00
See application file for complete search history.

(56) References Cited

U.S. PATENT DOCUMENTS

| | | | |
|---|---|---|---|
| 11,212,447 B1* | 12/2021 | Le | G03B 5/06 |
| 12,301,967 B2* | 5/2025 | Park | H04N 23/687 |
| 2013/0050515 A1 | 2/2013 | Wu et al. | |
| 2015/0268046 A1* | 9/2015 | Takizawa | G01C 19/5747 |
| | | | 73/504.12 |
| 2016/0241785 A1* | 8/2016 | Chiouchang | H04N 23/6812 |
| 2019/0089902 A1* | 3/2019 | Wei | H04N 23/57 |
| 2019/0141248 A1* | 5/2019 | Hubert | H02K 41/0356 |
| 2020/0260011 A1* | 8/2020 | Sasaki | G03B 5/00 |
| 2021/0329170 A1* | 10/2021 | Osaka | H04N 23/55 |
| 2022/0094853 A1* | 3/2022 | Xu | H04N 23/54 |
| 2023/0209198 A1* | 6/2023 | Lee | H04N 23/687 |
| | | | 348/208.11 |
| 2025/0085609 A1* | 3/2025 | Oh | G03B 5/00 |

\* cited by examiner

CAMERA AND ELECTRONIC DEVICE IMPLEMENTING IMAGE STABILIZATION USING IMAGE SENSOR DISPLACEMENT

CROSS-REFERENCE TO RELATED APPLICATIONS

This application is a National Stage of International Application No. PCT/CN2022/092699 filed on May 13, 2022, which claims priority to Chinese Patent Application No. 202110552856.X filed on May 20, 2021, both of which are hereby incorporated by reference in their entireties.

TECHNICAL FIELD

This application relates to the field of location control, and more specifically, to a camera module for implementing image stabilization by using displacement of an image sensor, and an electronic device.

BACKGROUND

Currently, application scenarios of a photographing function of a mobile apparatus are continuously expanded, including aerial photography, a motion camera, a dashboard camera, and the like. During photographing and video recording, the mobile apparatus is prone to a problem of blurring due to external vibration or shaking. In an existing optical image stabilization (Optical Image Stabilization, OIS for short) technology, an image stabilization motor drives a lens in a camera module to move, to perform displacement compensation on a slight shake of the camera, to implement image stabilization. The image stabilization motor includes a magnet and a coil. However, as an optical assembly of the camera needs to meet increasing requirements for a long focal length, macro, and the like, a quantity and a weight of lenses continuously increase. A thrust of an image stabilization driving apparatus in existing OIS has reached a bottleneck, and good image stabilization effect cannot be ensured.

SUMMARY

This application provides a camera module for implementing image stabilization by using displacement of an image sensor, and an electronic device, to improve image stabilization effect of the camera module.

According to a first aspect, this application provides a camera module. The camera module is mainly used in a mobile electronic device, for example, a mobile phone, a tablet computer, or an in-vehicle infotainment. The camera module includes a lens, an image sensor, a circuit board, a first magnetic driver group, and a second magnetic driver group. The circuit board includes a fastening assembly and a movable assembly. The fastening assembly and the movable assembly are integrated. The movable assembly includes an image sensor carrying assembly, one or more suspended beam assemblies, and one or more flexible assemblies. The one or more suspended beam assemblies and the image sensor carrying assembly are connected to the fastening assembly through the one or more flexible assemblies. In the foregoing technical solution, the fastening assembly and the movable assembly are machined and formed in a same circuit board. The image sensor carrying assembly is connected to the one or more suspended beam assemblies. The image sensor carrying assembly and the one or more suspended beam assemblies are connected to the fastening assembly through the one or more flexible assemblies. The image sensor carrying assembly is configured to carry the image sensor. The one or more suspended beams are configured to fasten the first magnetic driver group or the second magnetic driver group. The one or more flexible assemblies are configured to connect the movable assembly and the fastening assembly. The entire circuit board is compact in structure. In addition, in this application, the first magnetic driver group or the second magnetic driver group is directly fastened to the one or more suspended beam assemblies, so that an internal structure of the camera module is more compact, a machining procedure of an assembly process of the camera module is reduced, assembly efficiency and a product yield are improved, and a height of the camera module can be further reduced, which helps make the electronic device light and thin.

Further, the first magnetic driver group includes one or more first magnetic drivers. The second magnetic driver group includes one or more second magnetic drivers. The first magnetic driver is one of a magnet or a coil, and the second magnetic driver is the other of the magnet or the coil. The first magnetic driver group is fastened in the camera module, and the second magnetic driver group is fastened to the suspended beam assembly. Alternatively, the second magnetic driver group is fastened in the camera module, and the first magnetic driver group is fastened to the suspended beam assembly. In the foregoing technical solution, the first magnetic driver group and the second magnetic driver group are configured to cooperatively drive the one or more suspended beam assemblies to move relative to the camera module, to drive the image sensor carrying assembly to move. In addition, the image sensor is fastened to the image sensor carrying assembly, so that the first magnetic driver group and the second magnetic driver group finally cooperatively drive the image sensor to move relative to the camera module. In this application, the image sensor is displaced relative to the camera module, to compensate for a slight shake of the camera module. Compared with a solution in which the lens needs to be driven to perform displacement compensation on the slight shake of the camera module, when the image sensor is driven to perform displacement compensation, a weight of a component that needs to be driven is greatly reduced, and an image stabilization motor can implement a large image stabilization angle with only a low thrust. This helps the camera module obtain good image stabilization effect.

In a specific implementation solution, the movable assembly is formed through etching or laser cutting. In the foregoing technical solution, a shape of the movable assembly is complex, so that etching or laser cutting is used to facilitate machining of the circuit board, to ensure integration of the fastening assembly and the movable assembly.

In a specific implementation solution, a thickness of the movable assembly is less than a thickness of the fastening assembly. In the foregoing technical solution, in an etching or laser cutting process, a part of copper foil and a part of epoxy resin that are in the movable assembly and that are in a thickness direction are corroded or cut off, so that the thickness of the movable assembly is less than the thickness of the fastening assembly. Therefore, the movable assembly is light and easier to drive by the first magnetic driver group and the second magnetic driver group. In addition, a space formed by corroding or cutting the movable assembly in the thickness direction of the movable assembly provides an arrangement space for another device (an image sensor holder, a coil, or a magnet), so that the internal structure of the camera module is more compact.

In a specific implementation solution, the one or more flexible assemblies each include a bending structure. The bending structure is elastically deformed to absorb displacement of the image sensor. In the foregoing technical solution, the bending structure design is convenient to machine, and design and processing costs are reduced.

In a specific implementation solution, at least one of the one or more flexible assemblies is provided with an electrical signal wire. The electrical signal wire is electrically connected to the image sensor. In the foregoing technical solution, the flexible assembly may be used for wiring, so that no other electrical signal connector is required. Therefore, wires are more compact, and a product is more miniaturized.

In a specific implementation solution, an electrical signal is sent by the image sensor, and is transmitted to an image processor on the electronic device through the one or more flexible assemblies for processing. Alternatively, in a reverse direction, an electrical signal is sent by an image processor on the electronic device, and is transmitted to the image sensor through the one or more flexible assemblies.

In a specific implementation solution, the camera module further includes an image sensor holder. The image sensor holder is located on a side that is of the image sensor carrying assembly and that is away from incident light, is fastened to the image sensor carrying assembly, and is configured to fasten the image sensor. In the foregoing technical solution, the image sensor holder is of a sinking structure, so that impact on the height of the camera module is avoided to a maximum extent. This helps make the electronic device light and thin.

In a specific implementation solution, a height of the image sensor holder is less than the height of the fastening assembly. In the foregoing technical solution, the image sensor holder shares a height space of the camera module with the fastening assembly, so that the internal structure of the camera module is more compact, and the height of the camera module can be reduced. This helps make the electronic device light and thin and improve competitiveness of the camera module.

In a specific implementation solution, the movable assembly includes a first surface facing the incident light and a second surface opposite to the first surface. Electrical signal wires are disposed on both the first surface and the second surface. In the foregoing technical solution, compared with a design of a single-sided electrical signal wiring layer, double-sided electrical signal wiring may transmit more electrical signals. Therefore, when a same quantity of electrical signal wires are required, double-sided electrical signal wiring may occupy a smaller wiring space, and the product is more miniaturized. In addition, double-sided wiring enables the coil and an electronic component to be disposed on both the first surface and the second surface, so that more layout options are available.

In a specific implementation solution, the first surface of the movable assembly is configured to fasten at least one electronic component. The at least one electronic component includes at least one of a resistor, a capacitor, an inductor, and an integrated circuit. In the foregoing technical solution, the at least one electronic component may be fastened by using the first surface of the movable assembly, so that no other circuit board is required for fastening. Therefore, a layout of the electronic component is more compact, and the product is more miniaturized.

In a specific implementation solution, the second surface of the movable assembly is configured to fasten at least one electronic component. The at least one electronic component includes at least one of a resistor, a capacitor, an inductor, and an integrated circuit. A height of each electronic component is less than the thickness of the fastening assembly. In the foregoing technical solution, the at least one electronic component may be fastened by using the second surface of the movable assembly, so that no other circuit board is required for fastening. Therefore, a layout of the electronic component is more compact, and the product is more miniaturized. In addition, the electronic component may be fastened to a bottom surface of the circuit board, and the height of each electronic component is less than the thickness of the fastening assembly. Therefore, the electronic component can share the height space of the camera module with the image sensor holder, the first magnetic driver group, or the second magnetic driver group. In this way, an overall structure of the camera module is more compact, which helps reduce the height of the camera module. Further, the camera module is applicable to a light and thin electronic device, which helps promote and apply the camera module.

In a specific implementation solution, the camera module further includes an auto-focus motor. The auto-focus motor includes a third magnetic driver group and a fourth magnetic driver group that interact to drive the lens to move along an optical axis. Both the first magnetic driver group and the second magnetic driver group are separately disposed without interacting with the third magnetic driver group and the fourth magnetic driver group in the auto-focus motor. In the foregoing technical solution, the image stabilization motor is independent of the auto-focus motor, so that a requirement on mounting precision of the coil and the magnet in the image stabilization motor is low, which helps reduce manufacturing difficulty.

According to a second aspect, this application further provides an electronic device, including an image processor and any foregoing camera module. The image processor is communicatively connected to the camera module. The image processor is configured to: obtain image data from the camera module, and process the image data. For effects that can be achieved by the electronic device provided in the second aspect of this application, refer to effects corresponding to the first aspect and the implementation solutions of the first aspect. Details are not described herein again.

DESCRIPTION OF EMBODIMENTS

The following describes the technical solutions in embodiments of this application with reference to the accompanying drawings in embodiments of this application.

It is clear that the described embodiments are merely some but not all the embodiments of this application.

The following describes specific embodiments of this application with reference to the accompanying drawings.

Figure 1:
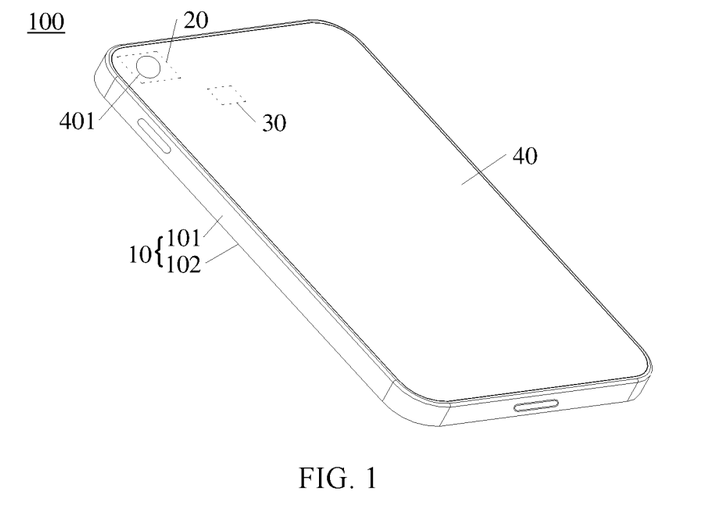
FIG. 1 is a schematic diagram of a structure of an electronic device according to an embodiment of this application in some embodiments.

FIG. 1 is a schematic diagram of a structure of an electronic device 100 according to an embodiment of this application in some embodiments. The electronic device 100 may be an electronic product, for example, a mobile phone, a tablet computer, a notebook computer, an in-vehicle infotainment, a wearable device, or a point of sales terminal (point of sales terminal, POS terminal for short). The wearable device may be a smart band, a smartwatch, augmented reality (augmented reality, AR) glasses, virtual reality (virtual reality, VR) glasses, or the like. This embodiment of this application is described by using an example in which the electronic device 100 is a mobile phone.

In some embodiments, the electronic device 100 includes a housing 10, a camera module 20, and an image processor 30. The camera module 20 and the image processor 30 are mounted to an inner side of the housing 10. The camera module 20 can collect light outside the electronic device 100, and form corresponding image data. The image processor 30 is communicatively connected to the camera module. The image processor 30 is configured to: obtain the image data from the camera module 20, and process the image data.

In some embodiments, the electronic device 100 may further include a display module 40. The housing 10 may include a frame 101 and a rear cover 102. The rear cover 102 and the display module 40 are fastened to two sides of the frame 101 respectively. The frame 101 and the rear cover 102 may be fastened to each other in an assembly manner, or may be integrated into a mechanical part.

For example, the display module 40 is provided with a transparent region 401, the camera module 20 collects light outside the electronic device 100 through the transparent region 401 of the display module 40, and the camera module 20 is used as a front-facing camera module of the electronic device 100. In some other embodiments, a camera hole is provided on the rear cover 102, the camera module 20 collects light outside the electronic device 100 through the camera hole on the rear cover, and the camera module 20 is used as a rear-facing camera module of the electronic device 100. In other words, the camera module 20 may be used as the front-facing camera module of the electronic device 100, or may be used as the rear-facing camera module of the electronic device 100. This is not strictly limited in this embodiment of this application.

Figure 2:
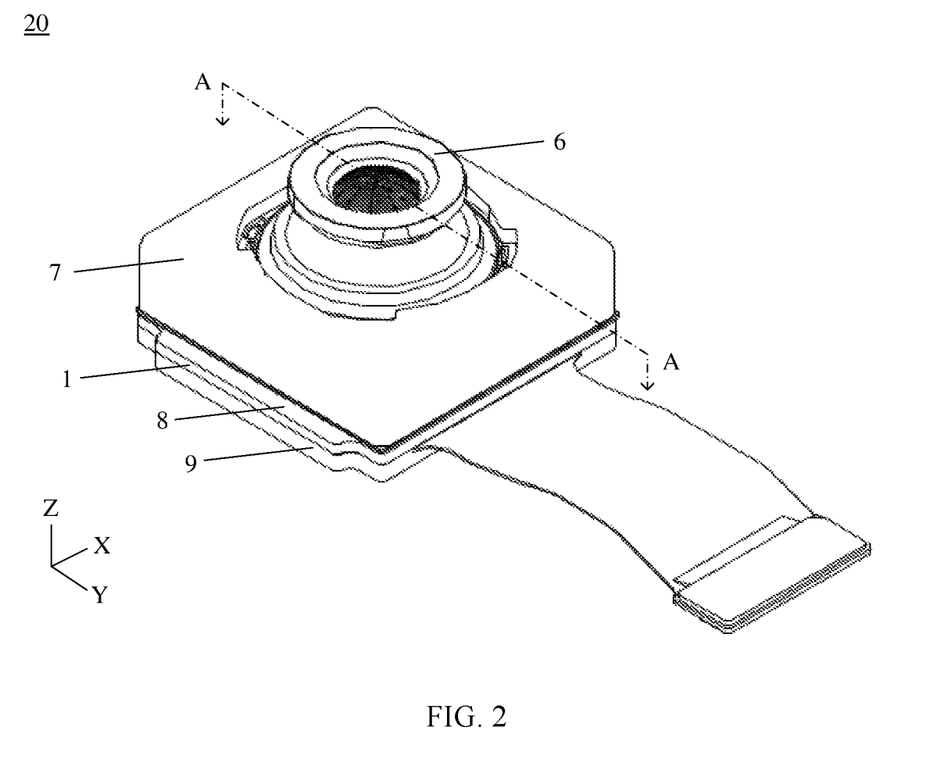
FIG. 2 is a schematic diagram of a structure of a camera module shown in FIG. 1 in some embodiments.
Figure 3:
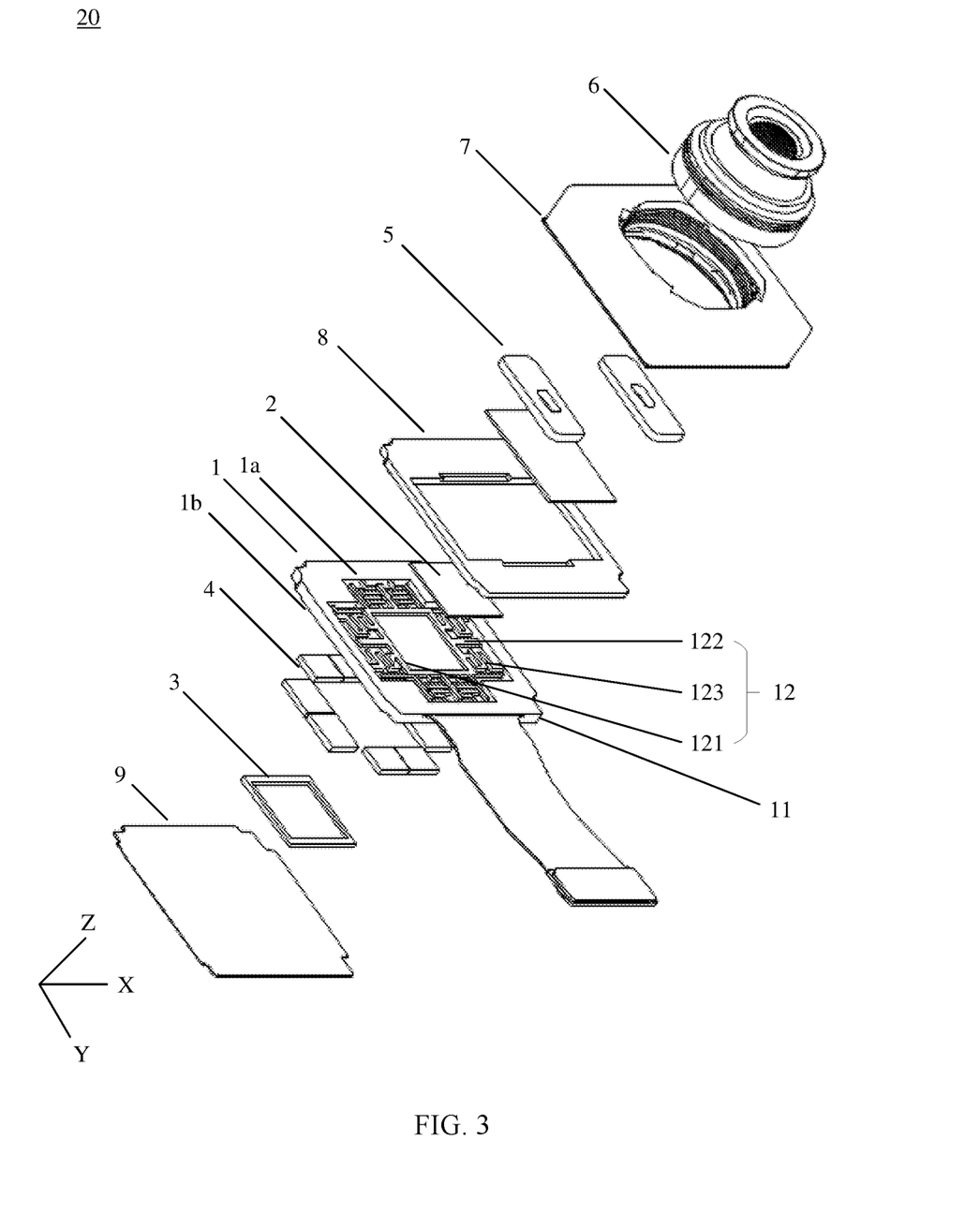
FIG. 3 is a schematic exploded view of a part of the structure of the camera module shown in FIG. 2.
Figure 4:
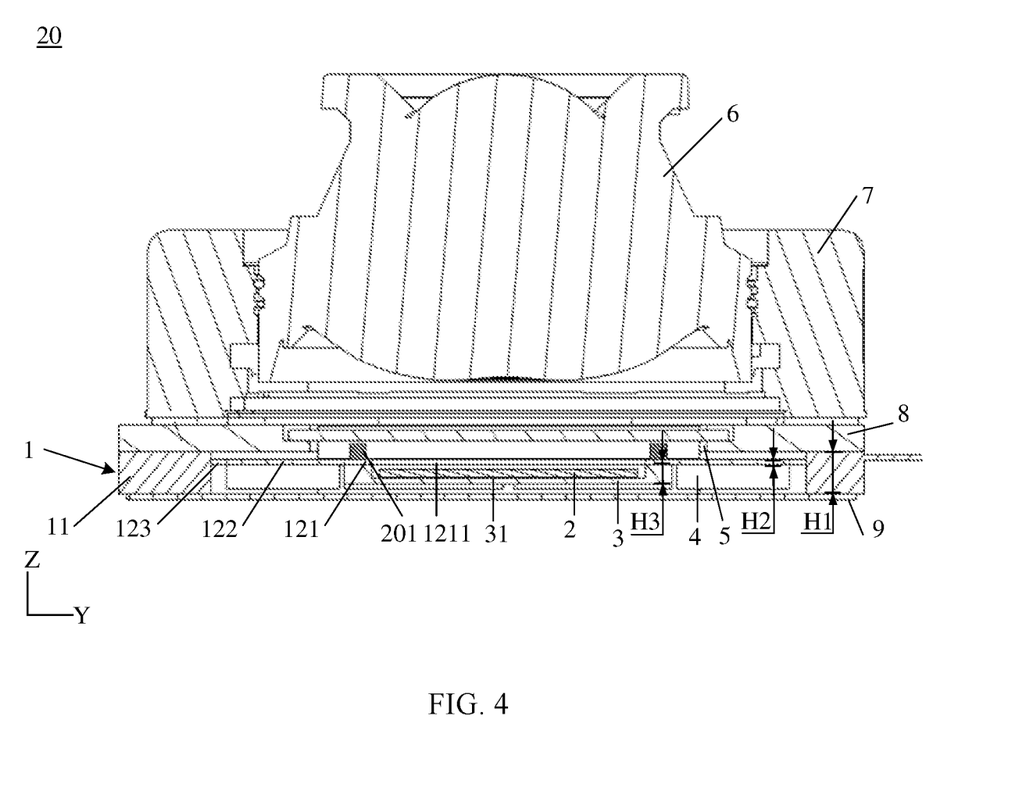
FIG. 4 is a schematic sectional view of the structure of the camera module shown in FIG. 2 in an A-A direction.

Refer to FIG. 2 to FIG. 4 together. FIG. 2 is a schematic diagram of a structure of the camera module 20 shown in FIG. 1 in some embodiments. FIG. 3 is a schematic exploded view of a part of the structure of the camera module 20 shown in FIG. 2. FIG. 4 is a schematic sectional view of the structure of the camera module 20 shown in FIG. 2 in an A-A direction. For ease of description below, in FIG. 2, a width direction of the camera module 20 is defined as an X direction, a length direction of the camera module 20 is defined as a Y direction, and a height direction of the camera module 20 is defined as a Z direction. The height direction Z of the camera module 20 is perpendicular to the length direction Y and the width direction X of the camera module 20.

In some embodiments, refer to FIG. 3. The camera module 20 includes a circuit board 1, an image sensor 2, an image sensor holder 3, a first magnetic driver group 4, a second magnetic driver group 5, a lens 6, a lens base 7, an upper bottom plate 8, and a lower bottom plate 9. The circuit board 1 includes a top surface 1a and a bottom surface 1b that are disposed opposite to each other. The top surface 1a and the bottom surface 1b of the circuit board 1 may be approximately perpendicular to the height direction Z of the camera module 20. It may be understood that orientation terms such as "top" and "bottom" in this application are described with reference to orientations in the accompanying drawings, do not indicate or imply that a specified apparatus or element needs to have a specific orientation and be constructed and operated in the specific orientation, and therefore cannot be construed as a limitation on this application. Unless otherwise specified, in this application, the "top surface" is a surface facing incident light, and the "bottom surface" is a surface away from the incident light.

The circuit board 1 includes a fastening assembly 11 and a movable assembly 12. The movable assembly 12 includes an image sensor carrying assembly 121, one or more suspended beam assemblies 122, and one or more flexible assemblies 123. The fastening assembly 11 is a peripheral part on the circuit board 1. The image sensor carrying assembly 121 is a part that is on the circuit board 1 and that corresponds to the image sensor 2. The image sensor carrying assembly 121 is slotted in a region in which the image sensor 2 is disposed. One end of each of the one or more suspended beam assemblies 122 is connected to the image sensor carrying assembly 121, and the other end remains suspended. The one or more flexible assemblies 123 each include a bending structure, configured to connect the movable assembly 12 and the fastening assembly 11. For example, the one or more suspended beam assemblies 122 and the image sensor carrying assembly 121 are connected to the fastening assembly 11 through the one or more flexible assemblies 123.

The image sensor carrying assembly 121 is configured to carrying the image sensor. Specifically, the image sensor carrying assembly 121 may be directly connected to the image sensor to implement carrying, or may implement carrying in an indirect manner (that is, by cooperating with another device). Refer to FIG. 4. In an example, the image sensor carrying assembly 121 carries the image sensor by cooperating with the image sensor holder 3. Specifically, the image sensor carrying assembly 121 is provided with a first open slot 1211. The image sensor holder 3 is fastened to a bottom surface of the image sensor carrying assembly 121 through bonding or welding. The image sensor holder 3 is provided with a first groove 31. The first groove 31 is located at a bottom of the first open slot 1211. In addition, the image sensor 2 is mounted in the image sensor holder 3, so that the image sensor 2 is carried on the image sensor carrying assembly 121. The image sensor 2 may be fastened to a bottom wall of the first groove 31 through an adhesive layer or a solder layer in a module assembly process of the camera module 20, so that the image sensor 2 is fastened to the image sensor holder 3.

In this application, a height H3 of the image sensor holder 3 is less than a thickness H1 of the fastening assembly 11. The height H3 of the image sensor holder 3 is a size of the image sensor holder 3 in the height direction Z of the camera module 20. The thickness H1 of the fastening assembly 11 is a size of the fastening assembly 11 in the height direction Z of the camera module 20. The image sensor holder 3 and the fastening assembly 11 may reuse a height space of the camera module 20, which helps reduce a height of the camera module 20.

The first magnetic driver group 4 includes one or more first magnetic drivers. The first magnetic driver is a magnet or a coil. The second magnetic driver group 5 includes one or more second magnetic drivers. The second magnetic driver is a magnet or a coil. The second magnetic driver is different from the first magnetic driver. To be specific, when the first magnetic driver group 4 is one magnet, the second magnetic driver group 5 is one or more coils; when the first magnetic driver group 4 is a plurality of magnets, the second magnetic driver group 5 is one or more coils; when the first magnetic driver group 4 is one coil, the second magnetic driver group 5 is one or more magnets; or when the first magnetic driver group 4 is a plurality of coils, the second magnetic driver group 5 is one or more magnets. A quantity of coils and a quantity of magnets are not strictly limited in this application.

The first magnetic driver group 4 is fastened in the camera module 20, and the second magnetic driver group 5 is fastened to the suspended beam assembly 122. Alternatively, the first magnetic driver group 4 and the second magnetic driver group 5 are transposed, that is, the first magnetic driver group 4 is fastened to the suspended beam assembly 122, and the second magnetic driver assembly 5 is fastened in the camera module 20.

Optionally, a layout manner of the first magnetic driver group 4 and the second magnetic driver group 5 is as follows: One or more coils are fastened to a top surface of the one or more suspended beam assemblies 122 through bonding or welding, and one or more magnets are fastened to the bottom surface 1b of the fastening assembly 11. Alternatively, one or more coils are fastened to the top surface 1a of the fastening assembly 11, and one or more magnets are fastened to a bottom surface of the one or more suspended beam assemblies 122. In addition, in some embodiments, a layout manner of the first magnetic driver group 4 and the second magnetic driver group 5 may alternatively be as follows: One or more magnets are fastened to a top surface of one or more suspended beam assemblies 122, and one or more coils are fastened to the bottom surface 1b of the fastening assembly 11; or one or more magnets are fastened to the top surface 1a of the fastening assembly 11, and one or more coils are fastened to a bottom surface of the one or more suspended beam assemblies 11. It should be understood that when the coil or the magnet is fastened to the top surface or the bottom surface of the one or more suspended beam assemblies 122 through bonding or welding, because the adhesive layer and the solder layer have specific thicknesses, the coil or the magnet remains a specific height from the one or more flexible assemblies 123 in the direction Z, that is, the coil or the magnet is not directly lapped to the one or more flexible assemblies 123, and therefore does not interfere with movement of the one or more flexible assemblies 123.

The first magnetic driver group 4 or the second magnetic driver group 5 located on the side of the bottom surface 1a of the fastening assembly 11 can reuse the height space of the camera module 20 with the image sensor holder 3, which helps reduce the height of the camera module 20.

The first magnetic driver group 4 and the second magnetic driver group 5 are configured to cooperatively drive the one or more suspended beam assemblies 122 to move relative to the camera module 20, to drive the image sensor carrying assembly 121 to move. In addition, the image sensor holder 3 is fastened to the image sensor carrying assembly 121, and the image sensor 2 is fastened in the image sensor holder 3, so that the first magnetic driver group 4 and the second magnetic driver group 5 finally cooperatively drive the image sensor 2 to move relative to the camera module 20. In this application, the image sensor 2 is displaced relative to the camera module 20, to compensate for a slight shake of the camera module 20. Compared with a solution in which the lens needs to be driven to perform displacement compensation on the slight shake, when the image sensor 2 is driven to perform displacement compensation, a weight of a component that needs to be driven is greatly reduced, and an image stabilization driving apparatus can implement a large image stabilization angle with only a low thrust. This helps the camera module obtain good image stabilization effect.

In this application, an independent image stabilization apparatus is used. To be specific, at least one group of magnets and coils in the camera module 20 are independently configured to drive the image sensor 2 to perform image stabilization. The camera module 20 further includes the lens base 7. For example, an auto-focus motor is disposed in the lens base 7. The auto-focus motor includes a third magnetic driver group and a fourth magnetic driver group that interact to drive the lens 6 to move along an optical axis. Both the first magnetic driver group 4 and the second magnetic driver group 5 are separately disposed without interacting with the third magnetic driver group and the fourth magnetic driver group in the auto-focus motor. In this application, the independent image stabilization apparatus is used, so that a requirement on mounting precision of the coil and the magnet in an image stabilization motor is low, which helps reduce manufacturing difficulty.

The lens base 7 is fastened to a top surface of the upper bottom plate 8. For example, the lens base 7 and the upper bottom plate 8 may be fastened to each other through bonding. For example, the camera module 20 may further include a first adhesive layer. The first adhesive layer is located between a bottom surface of the lens base 7 and the top surface of the upper bottom plate 8, and is configured to fasten the lens base 7 and the upper bottom plate 8. In some other embodiments, the lens base 7 and the upper bottom plate 8 may be fastened to each other through welding. For example, the camera module 20 may further include a first solder layer. The first solder layer is located between a bottom surface of the lens base 7 and the top surface of the upper bottom plate 8, and is configured to fasten the lens base 7 and the upper bottom plate 8. To be specific, the lens base 7 may be bonded or welded to the upper bottom plate 8. A connection manner between the lens base 7 and the upper bottom plate 8 is simple, easy to implement, and low in cost.

The lens 6 is mounted to an inner side of the lens base 7. The lens 6 is configured to converge light to the image sensor 2. To be specific, the lens 6 may converge external light, and project the converged external light to the image sensor 2, to form a corresponding light image on the image sensor 2. The lens 6 may include a lens tube and a lens group fastened to an inner side of the lens tube. The image sensor 2 is located on an image side of the lens group. An image-side surface of a last lens in the lens group is disposed facing the image sensor 2. For example, a quantity of lenses in the lens group may be 5 to 10, for example, 7 or 8. In this application, the lens base 7 includes the auto-focus motor. The auto-focus motor can drive the lens group to move in a direction parallel to the optical axis of the lens 6. For example, the auto-focus motor includes one or more magnets and one or more coils. A specific structure of the auto-focus motor is not strictly limited in this application.

The upper bottom plate 8 is located between the top surface 1a of the circuit board 1 and the bottom surface of the lens base 7, and is configured to fasten the lens base 7.

The lower bottom plate 9 is located on the bottom surface 1b of the circuit board 1, and is connected to the fastening assembly 11. The lower bottom plate 9 is configured to fasten the circuit board 1. In addition, the lower bottom plate 9 can also perform sealing protection on a device (the image sensor holder 3, the coil or magnet, an electronic component, or the like) in a space between the movable assembly 12 and the fastening assembly 11 in the direction Z.

In some embodiments, the camera module 20 further includes an electronic component 201. The electronic component 201 is mounted to a top surface of the movable assembly 12, that is, a surface that is of the movable assembly 12 and that faces the incident light. For example, the electronic component 201 may be fastened to a top surface of the image sensor carrying assembly 121 through welding, or may be fastened to the top surface of one or more suspended beam assemblies 122. At least one electronic component 201 is fastened to the top surface of the movable assembly 12. The electronic component 201 includes at least one of a resistor, a capacitor, an inductor, and an integrated circuit (Integrated circuit, IC for short), for each of which there is at least one. To be specific, a plurality of resistors, a plurality of capacitors, a plurality of inductors, and a plurality of integrated circuits may be fastened to the bottom surface of the movable assembly 12. A type and a quantity of the electronic component 201 are not strictly limited in this application.

In some embodiments, the electronic component 201 may alternatively be mounted to a bottom surface of the movable assembly 12, that is, a surface that is of the movable assembly 12 and that is away from the incident light. For example, the electronic component 201 may be fastened to a bottom surface of the image sensor carrying assembly 121 through welding, or may be fastened to the bottom surface of one or more suspended beam assemblies 122. At least one electronic component 201 is fastened to the bottom surface of the movable assembly 12. The electronic component 201 includes at least one of a resistor, a capacitor, an inductor, and an integrated circuit (Integrated circuit, IC for short), for each of which there is at least one. To be specific, a plurality of resistors, a plurality of capacitors, a plurality of inductors, and a plurality of integrated circuits may be fastened to the bottom surface of the movable assembly 12. A type and a quantity of the electronic component 201 are not strictly limited in this application.

In a conventional camera module, an electronic component 201 is usually disposed on a top surface of a circuit board 1 in a protruding manner. The camera module 20 needs to reserve a specific space on the top surface of the circuit board 1 to accommodate the electronic component 201. As a result, a height size of the camera module 20 is large. In this application, electrical signal wires are disposed on both the top surface and the bottom surface of the movable assembly 12. The electronic component 201 may be fastened to the bottom surface of the circuit board. A height of the electronic component 201 is less than the thickness of the fastening assembly 11. The electronic component 201 can share the height space of the camera module 20 with the image sensor holder 3, the first magnetic driver group 4, or the second magnetic driver group 5. In this way, an overall structure of the camera module 20 is more compact, which helps reduce the height of the camera module 20. Further, the camera module 20 is applicable to a light and thin electronic device, which helps promote and apply the camera module 20.

Figure 5:
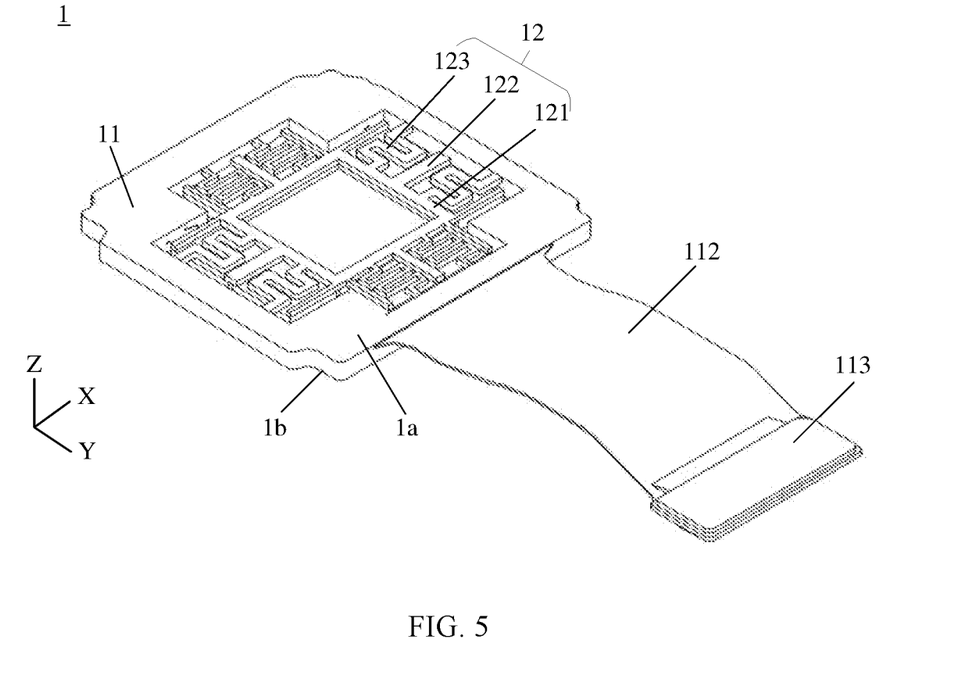
FIG. 5 is a schematic diagram of a structure of a circuit board shown in FIG. 3.

FIG. 5 is a schematic diagram of a structure of the circuit board 1 shown in FIG. 3.

In some embodiments, the circuit board 1 includes the fastening assembly 11 and the movable assembly 12. The movable assembly 12 includes the image sensor carrying assembly 121, the one or more suspended beam assemblies 122, and the one or more flexible assemblies 123. The movable assembly 12 is connected to the fastening assembly 11 through the one or more flexible assemblies 123. The fastening assembly 11 and the movable assembly 12 are integrated. Integration means that the fastening assembly 11 and the movable assembly 12 are machined and formed in a same circuit board 1. The peripheral part on the circuit board 1 is used as the fastening assembly 11. An image sensor region on the circuit board 1 forms the movable assembly 12 through etching or laser cutting. An etching or laser cutting manner is well known to a person skilled in the art, and details are not described in this application. In an etching or laser cutting process, a part of copper foil in a metal substrate layer of the circuit board 1 and a part of epoxy resin in a substrate material are corroded or cut off, so that a thickness H2 of the movable assembly 12 is less than the thickness H1 of the fastening assembly 11. Therefore, the movable assembly 12 is light and easier to drive.

In an integrated machining manner used for the circuit board 1, the fastening assembly 11 and the movable assembly 12 are integrated to the same circuit board. The movable assembly 12 further includes the image sensor carrying assembly 121, the one or more suspended beam assemblies 122, and the one or more flexible assemblies 123. The entire circuit board is compact in structure and easy to machine through etching or laser cutting. In addition, in this application, the coil or the magnet of the image stabilization motor is directly fastened to the one or more suspended beam assemblies 122 on the movable assembly 12, so that an internal structure of the camera module is more compact, a machining procedure of an assembly process of the camera module is reduced, assembly efficiency and a product yield are improved, and the height of the camera module can be further reduced, which helps make the electronic device light and thin.

The circuit board 1 includes the metal substrate layer, an insulation medium layer, and an electrical signal wiring layer. A metal substrate is made of non-magnetic or low-magnetic metal, usually copper. The metal substrate is configured to reinforce the circuit board 1, so that the circuit board 1 has adequate structural strength to better carry other devices and structures. In some embodiments, the metal substrate may be further configured to perform heat conduction, so that heat of the circuit board 1 and a device fastened to the circuit board 1 can be quickly dissipated, to improve reliability of the camera module 20. The insulation medium layer is usually made of photosensitive polyimide (PSPI for short) and polyimide (PI for short). The electrical signal wiring layer is formed by first forming a conductive film and then performing a patterning process on the conductive film. The patterning process includes photoresist layer coating, mask exposure, development, etching, and other processes. The electrical signal wiring layer is made of metal copper.

A manufacturing process of the circuit board 1 relates to lamination of photosensitive polyimide (PSPI for short) and metal, interlayer lamination of polyimide (PI for short) and polyimide, fine circuit machining, laser forming, and the like. The circuit board 1 is configured to implement an electrical connection between the image sensor 2 and a mainboard of the electronic device 100. In addition, the circuit board 1 is configured as a key support component to carry an on-board device including the image sensor 2 and the electronic component 201.

For example, the circuit board 1 may be a rigid-flexible circuit board. For example, as shown in FIG. 5, the circuit board 1 includes a first rigid board part 111, a flexible board part 112, and a second rigid board part 113 that are sequentially arranged. A board surface area of the first rigid board part 111 is greater than a board surface area of the second rigid board part 113. The first rigid board part 111 and the second rigid board part 113 are rigid boards. The flexible board part 112 is a flexible board. The flexible board is easier to bend than the rigid board.

The fastening assembly 11 on the circuit board 1 is an assembly fastened relative to the movable assembly 12, and is fastened in the lens base 7. The fastening assembly 11 may be configured to fasten the first magnetic driver group 4 or the second magnetic driver group 5.

The movable assembly 12 is designed on the circuit board 1 based on a specific shape, and is formed through etching or laser cutting. The movable assembly 12 is displaced relative to the fastening assembly 11 under interaction of the first magnetic driver group 4 and the second magnetic driver group 5. Further, the fastening assembly 11 is fastened to the lens base 7, so that the movable assembly 12 may be displaced relative to the camera module 20. In the etching or laser cutting process, a part of copper foil in the metal substrate layer of the circuit board 1 and a part of epoxy resin in the substrate material are corroded or cut off, so that the thickness H2 of the movable assembly 12 is less than the thickness H1 of the fastening assembly 11. Therefore, the movable assembly 12 is light and easier to drive. In addition, an overall weight of the camera module 20 may be further reduced.

As a part of the circuit board 1, the movable assembly 12 also includes the metal substrate layer, the insulation medium layer, and the electrical signal wiring layer. The metal substrate layer and the electrical signal wiring layer are made of metal copper. The insulation medium layer is made of photosensitive polyimide (PSPI for short) or polyimide (PI for short). A manufacturing process of the movable assembly 12 relates to lamination of PSPI and metal, interlayer lamination of PI and PI, fine circuit machining, laser forming, and the like.

Figure 6A:
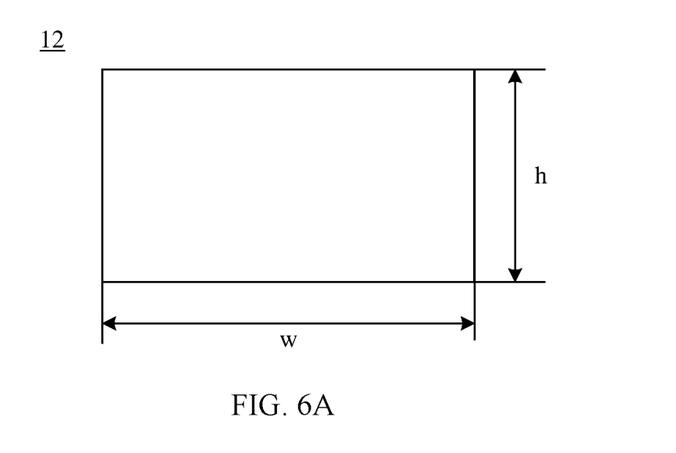
FIG. 6A to FIG. 6F are sectional views of a movable assembly of the circuit board shown in FIG. 5 in a Z direction.

FIG. 6A to FIG. 6E are sectional views of the movable assembly 12 in the direction Z. The direction Z is a direction parallel to an optical axis of the camera module 20. As shown in FIG. 6A, the movable assembly 12 may have a width size (denoted as w in FIG. 6A) and a thickness size (denoted as h in FIG. 6A). FIG. 6B to FIG. 6F show some example implementation solutions of an electrical signal wiring layout in the movable assembly 12.

Figure 6B:
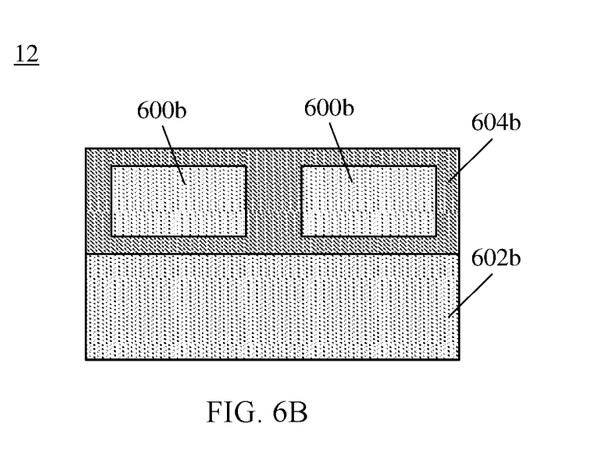

In an implementation, refer to FIG. 6B. A double-layer wiring manner is used for the movable assembly 12. Double-layer wiring means that there are two layers of layout including metal copper. One layer is an electrical signal wiring layer 600b. The electrical signal wiring layer 600b includes two differential signal wires. The other layer is a metal substrate layer 602b, configured to reinforce the movable assembly 12 and ground. Each differential signal wire has a width of 10 to 20 μm and a thickness of 10 to 50 μm. An interval between the two differential signal wires is 5 to 10 μm. A thickness of an insulation medium layer 604b is 5 to 15 μm. A thickness of the metal substrate layer 602b may be adjusted based on an actual requirement, and may be designed to be 10 to 100 μm.

Figure 6C:
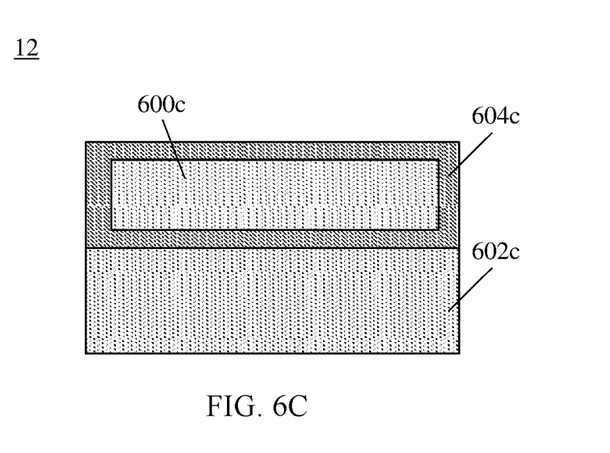

In an implementation, refer to FIG. 6C. Another double-layer wiring manner is used for the movable assembly 12. One layer is an electrical signal wiring layer 600c. The electrical signal wiring layer 600c includes one electrical signal wire. The other layer is a metal substrate layer 602c, configured to reinforce the movable assembly 12 and ground. The electrical signal wire has a width of 10 to 20 μm and a thickness of 10 to 50 μm. A thickness of an insulation medium layer 604c is 5 to 15 μm. A thickness of a metal substrate layer 602c may be adjusted based on an actual requirement, and may be designed to be 10 to 100 μm.

Figure 6D:
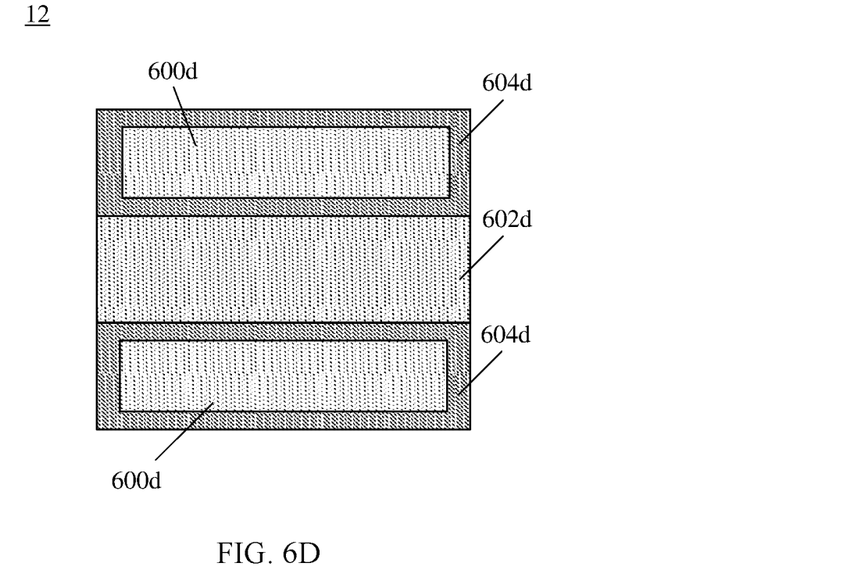

In an implementation, refer to FIG. 6D. A three-layer wiring manner is used for the movable assembly 12. Three-layer wiring means that there are three layers of layout including metal copper. A metal substrate layer 602d is located in middle. An electrical signal wiring layer 600d is designed at each of a top and a bottom of the metal substrate layer 602d. One electrical signal wire is disposed in each electrical signal wiring layer 600d. The electrical signal wire has a width of 10 to 20 μm and a thickness of 10 to 50 μm. A thickness of an insulation medium layer 604d is 5 to 15 μm. A thickness of a metal substrate layer 602d may be adjusted based on an actual requirement, and may be designed to be 10 to 100 μm.

Figure 6E:
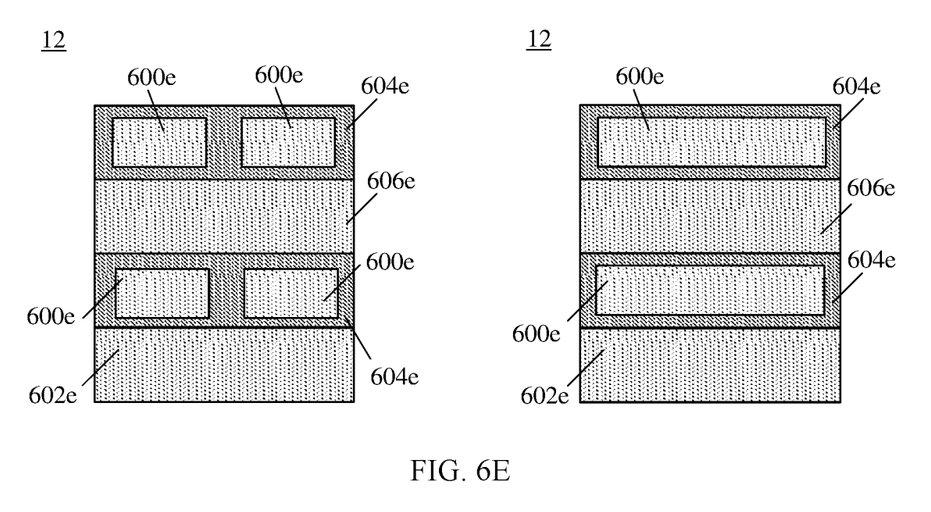

In an implementation, refer to FIG. 6E. The movable assembly 12 further includes a power or reference layer 606e. The power or reference layer 606e is located between two electrical signal wiring layers 600e, and is configured to shield a high-speed differential signal in the electrical signal wiring layer 600e. The power or reference layer 606e is made of metal copper. A four-layer wiring manner is used for the movable assembly 12. Four-layer wiring means that there are four layers of layout including metal copper. A metal substrate layer 602e is located at a bottom layer. Two electrical signal wiring layers 600e are disposed at a top of the metal substrate layer 602e. A power or insulation layer 606e is disposed between the two electrical signal wiring layers 600e. It should be noted that each electrical signal wiring layer 600e may include two electrical signal wires, or may include only one electrical signal wire. The electrical signal wire has a width of 10 to 20 μm and a thickness of 10 to 50 μm. A thickness of an insulation medium layer 604e is 5 to 15 μm. A thickness of the power or reference layer 606e is 10 to 25 μm. A thickness of the metal substrate layer 602e may be adjusted based on an actual requirement, and may be designed to be 10 to 100 μm.

Figure 6F:
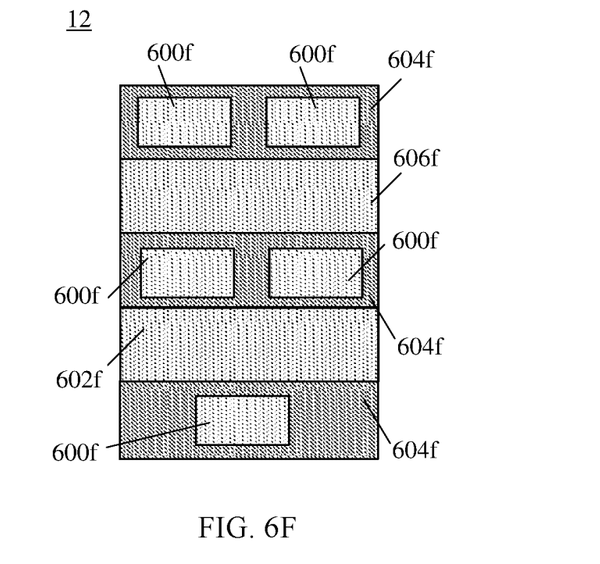

In an implementation, refer to FIG. 6F. The movable assembly 12 further includes a power or reference layer 606f. The power or reference layer is located between two electrical signal wiring layers 600f, and is configured to shield a high-speed differential signal in the electrical signal wiring layer 600f. The power or reference layer 606f is made of metal copper. A five-layer wiring manner is used for the movable assembly 12. Five-layer wiring means that there are five layers of layout including metal copper. The movable assembly 12 is provided with three electrical signal wiring layers 600f, where two three electrical signal wiring layers 600f are located on a top surface of a metal substrate layer 602f, and one electrical signal wiring layer 600f is located on a bottom surface of the metal substrate layer 602f. It should be noted that each of the two electrical signal wiring layers 600f located on the top surface of the metal substrate layer 602f includes two electrical signal wires, and the electrical signal wiring layer 600f located on the bottom surface of the metal substrate layer 602f includes one electrical signal wire. The electrical signal wire has a width of 10 to 20 μm and a thickness of 10 to 50 μm. A thickness of an insulation medium layer 604f is 5 to 15 μm. A thickness of the power or reference layer 606f is 10 to 25 μm. A thickness of the metal substrate layer 602f may be adjusted based on an actual requirement, and may be designed to be 10 to 100 μm.

Alternatively, wiring of more than five layers may be designed for the movable assembly 12 in this application based on an actual product requirement. To be specific, two or more electrical signal wiring layers are disposed on one side or two sides of the metal substrate layer. Signal shielding is performed between every two adjacent electrical signal wiring layers through a power or reference layer. Each electrical signal wiring layer may include two electrical signal wires, or may include only one electrical signal wire. Details are not described in this application.

A design with a plurality of (more than or equal to two) electrical signal wiring layers is used for the movable assembly 12. Compared with a design with a single electrical signal wiring layer, this design can transmit more electrical signals. Therefore, when a same quantity of electrical signal wires are required, disposing the plurality of electrical signal wiring layers can occupy a smaller wiring space.

The movable assembly 12 includes the image sensor carrying assembly 121, the one or more suspended beam assemblies 122, and the one or more flexible assemblies 123.

The image sensor carrying assembly 121 is located in a peripheral region of the image sensor 2, and is configured to fasten the image sensor holder 3. Further, the image sensor 2 is fastened in the image sensor holder 3, so that the image sensor carrying assembly 121 is configured to carry the image sensor 2.

One end of each of the one or more suspended beam assemblies 122 is connected to the image sensor carrying assembly 121, and the other end remains suspended. The one or more suspended beam assemblies 122 are configured to fasten the first magnetic driver group 4 or the second magnetic driver group 5. Under interaction of the first magnetic driver group 4 or the second magnetic driver group 5, the one or more suspended beam assemblies 122 first move relative to the fastening assembly 11, to drive the image sensor carrying assembly 121 to move relative to the fastening assembly 11 and finally drive the image sensor 2 to move relative to the fastening assembly 11.

One end of each of the one or more flexible assemblies 123 is connected to the image sensor carrying assembly 121, and the other end is connected to the fastening assembly 11, to suspend the movable assembly 12. At least one of the one or more flexible assemblies 123 is provided with an electrical signal wire, configured to transmit an electrical signal between the image sensor 2 and an external device. For example, the electrical signal is sent by the image sensor 2, and is sequentially transmitted to the image processor 30 on the mainboard of the electronic device 100 for processing through the one or more flexible assemblies 123, the flexible board part 112, and the second rigid board part 113. Alternatively, the electrical signal is sent by the image processor 30, and is transmitted to the image sensor 2 through the second rigid board part 113, the flexible board part 112, and the one or more flexible assemblies 123.

Figure 7:
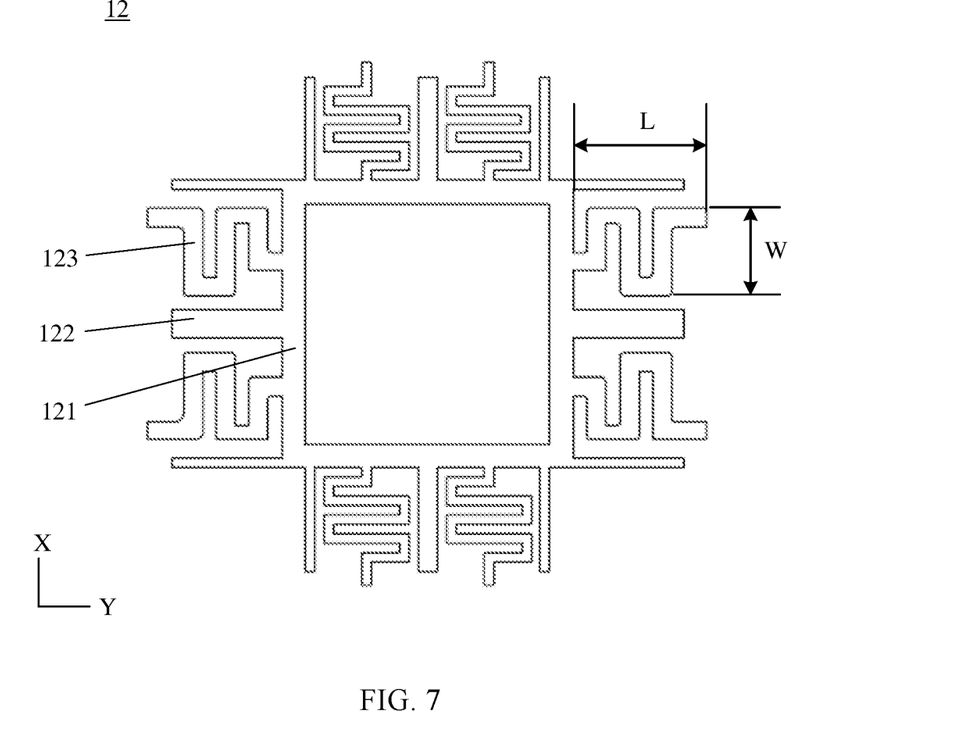
FIG. 7 is a schematic diagram of a structure of the movable assembly of the circuit board shown in FIG. 5.

Refer to FIG. 7. The one or more flexible assemblies 123 each include a bending structure. When the image sensor 2 is displaced relative to the fastening assembly 11, the bending structure may be elastically deformed to absorb displacement of the image sensor 2, to keep an overall structure of the circuit board 1 stable. Based on a magnitude of driving force generated through interaction of the first magnetic driver group 4 and the second magnetic driver group 5 and a specific size of the camera module 20, the one or more flexible assemblies 123 each may be designed in a specific coil shape. In an embodiment, as shown in FIG. 7, the one or more flexible assemblies 123 each are designed in a snake-shaped winding shape, and are distributed in the direction X and the direction Y of the movable assembly 12. One or more flexible assemblies 123 in the direction Y are used as an example. N indicates a quantity of bends of one flexible assembly 123. L indicates a length of one flexible assembly 123, that is, a distance of one flexible assembly 123 between the image sensor carrying assembly 121 and the fastening assembly 11 in the direction Y W indicates a width of one flexible assembly 123, that is, a size of one flexible assembly 123 in the direction X. For example, N=2, L=2.5 mm, and W=1.8 mm.

Various shape designs and layout manners are used for the one or more flexible assemblies 123. For example, each flexible assembly may include one or more bends, and different flexible assemblies may have different quantities of bends. An angle of the bend may be 90 degrees, or may not be 90 degrees. A quantity of flexible assemblies on each side of the image sensor carrying assembly 3 may be the same or different. Different flexible assemblies may be parallel to each other, or may not be parallel to each other. The flexible assemblies may be evenly spaced from each other, or may be unevenly spaced from each other. Any flexible assembly with a bending structure design and a layout change that can be easily figured out shall fall within the protection scope of this application.

In some embodiments, the camera module 20 further includes a connection wire. One end of the connection wire is welded to the image sensor 2, and the other end is welded to a first pad. The first pad is located on the movable assembly 12. The connection wire is configured to implement an electrical connection between the image sensor 2 and the movable assembly 12. For example, the first pad may be disposed on the top surface of the image sensor carrying assembly 121. The image sensor 2 is connected to the image sensor carrying assembly 121 through the connection wire, to be electrically connected to the circuit board 1. The connection wire may be made of gold, copper, or aluminum. The connection wire is formed through a wire bonding (wire bonding, WB for short) process. The wire bonding process may also be referred to as a pressure welding process, a bonding process, a bonding process, or a wire welding process. A surface treatment layer may be formed on the first pad through an electroless nickel electroless palladium immersion gold (electroless nickel electroless palladium immersion gold, ENEPIG) technology. In this case, the surface treatment layer of the first pad makes it easier to implement the wire bonding process for the connection wire and the first pad, and a yield is higher.

In some other embodiments, the image sensor 2 may alternatively be welded to the bottom wall of the first groove 31 of the image sensor holder 3 in a flip chip (flip chip) manner. In this case, the camera module 20 may not be provided with a connection wire.

In this embodiment of this application, the circuit board in the camera module is of an integrated structure, so that a support structure of the conventional camera module can be eliminated. Therefore, the coil or the magnet of the image stabilization motor can be directly fastened to the circuit board to drive the image sensor. In this way, a driving weight of the image stabilization motor is reduced, and image stabilization effect of the camera module is improved. In addition, the image stabilization motor of the camera module is independently disposed, and the image stabilization motor does not share a coil or a magnet with the auto-focus motor. Therefore, a requirement on mounting precision of the coil or the magnet is low, and manufacturing difficulty can be reduced. In addition, the disposed image sensor holder shares the height space of the camera module with the circuit board, so that the internal structure of the camera module is more compact, and the height of the camera module can be reduced. This helps make the electronic device light and thin and improve competitiveness of the camera module.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Embodiments of this application and features in embodiments may be mutually combined provided that no conflict occurs. Therefore, the protection scope of this application shall be subject to the protection scope of the claims.

What is claimed is:

1. A camera, comprising:
    an image sensor;
    a circuit board comprising a fastening assembly and a movable assembly integrated with one another, the movable assembly comprising an image sensor carrying assembly configured to carry the image sensor, one or more suspended beam assemblies, and one or more flexible assemblies, the movable assembly being connected to the fastening assembly through the one or more flexible assemblies;
    a first magnetic driver group comprising one or more first magnetic drivers;
    a second magnetic driver group comprising one or more second magnetic drivers, the first magnetic driver group comprising one or more first magnetic drivers each comprising a magnet or a coil, and the second magnetic driver group comprising one or more second magnetic drivers each comprising being the other of the magnet or the coil; and
    the first magnetic driver group is fastened in the camera, and the second magnetic driver group is fastened to the suspended beam assembly, or the second magnetic driver group is fastened in the camera, and the first magnetic driver group is fastened to the suspended beam assembly.

2. The camera according to claim 1, wherein the movable assembly is formed through etching or laser cutting.

3. The camera according to claim 1, wherein a thickness of the movable assembly is less than a thickness of the fastening assembly.

4. The camera according to claim 1, wherein the one or more flexible assemblies each comprise a bending structure that is elastically deformable to absorb displacement of the image sensor.

5. The camera according to claim 1, wherein at least one of the one or more flexible assemblies is provided with an electrical signal wire electrically connected to the image sensor.

6. The camera according to claim 1, wherein the camera further comprises an image sensor holder that:
    is located on a side of the image sensor carrying assembly located away from a direction where incident light would enter the camera;
    is fastened to the image sensor carrying assembly; and
    is configured to fasten to the image sensor.

7. The camera according to claim 6, wherein a height of the image sensor holder is less than the thickness of the fastening assembly.

8. The camera according to claim 1, wherein:
    the movable assembly comprises a first surface facing a direction where incident light would enter the camera;
    a second surface opposite to the first surface; and
    electrical signal wires disposed on both the first surface and the second surface.

9. The camera according to claim 8, wherein the first surface of the movable assembly is configured to fasten at least one electronic component, and the at least one electronic component comprises at least one of a resistor, a capacitor, an inductor, or an integrated circuit.

10. The camera according to claim 8, wherein the second surface of the movable assembly is configured to fasten at least one electronic component, the at least one electronic component comprising at least one of a resistor, a capacitor, an inductor, or an integrated circuit, and a height of each electronic component is less than the thickness of the fastening assembly.

11. The camera according to claim 1, further comprising:
    a lens; and
    an auto-focus motor coupled to the lens, the auto-focus motor comprising a third magnetic driver group and a fourth magnetic driver group that interact to drive the lens to move along an optical axis, wherein:
    the third magnetic driver group comprises one or more third magnetic drivers each comprising a magnet or a coil;
    the fourth magnetic driver group comprises one or more fourth magnetic drivers each comprising the other of the magnet or the coil forming each of the third magnetic drivers; and
    the first and second magnetic driver groups are electrically isolated from the third and fourth magnetic driver groups.

12. The camera according to claim 1, wherein the first magnetic driver group is fastened to the fastening assembly and the second magnetic driver group is fastened to the suspended beam assembly.

13. The camera according to claim 1, wherein the first magnetic driver group is fastened to the suspended beam assembly and the second magnetic driver group is fastened to the fastening assembly.

14. An electronic device, comprising an image processor and a camera, wherein the image processor is communicatively connected to the camera and is configured to obtain image data from the camera and process the image data, wherein the camera comprises:
    an image sensor;
    a circuit board comprising a fastening assembly and a movable assembly integrated with one another, the movable assembly comprising an image sensor carrying assembly configured to carry the image sensor, one or more suspended beam assemblies, and one or more flexible assemblies, the movable assembly being connected to the fastening assembly through the one or more flexible assemblies;
    a first magnetic driver group comprising one or more first magnetic drivers; and
    a second magnetic driver group comprising one or more second magnetic drivers, the first magnetic driver group comprising one or more first magnetic drivers each comprising a magnet or a coil, and the second magnetic driver group comprising one or more second magnetic drivers each comprising the other of the magnet or the coil; and
    the first magnetic driver group is fastened in the camera and the second magnetic driver group is fastened to the suspended beam assembly, or the second magnetic driver group is fastened in the camera and the first magnetic driver group is fastened to the suspended beam assembly.

15. The electronic device according to claim 14, wherein the one or more flexible assemblies each comprise a bending structure that is elastically deformable to absorb displacement of the image sensor.

16. The electronic device according to claim 14, wherein the camera further comprises an image sensor holder that:
   is located on a side of the image sensor carrying assembly located away from a direction where incident light would enter the camera;
   is fastened to the image sensor carrying assembly; and
   is configured to fasten to the image sensor.

17. The electronic device according to claim 14, wherein the movable assembly comprises:
   a first surface facing a direction where incident light would enter the camera;
   a second surface opposite to the first surface; and
   electrical signal wires disposed on both the first surface and the second surface.

18. The electronic device according to claim 17, wherein the first surface of the movable assembly is configured to fasten at least one electronic component, and the at least one electronic component comprises at least one of a resistor, a capacitor, an inductor, or an integrated circuit.

19. The electronic device according to claim 17, wherein:
   the second surface of the movable assembly is configured to fasten at least one electronic component, the at least one electronic component comprising at least one of a resistor, a capacitor, an inductor, or an integrated circuit; and
   a height of each electronic component is less than the thickness of the fastening assembly.

20. The electronic device according to claim 14, wherein:
   the camera further comprises a lens and an auto-focus motor, the auto-focus motor comprising a third magnetic driver group and a fourth magnetic driver group that interact to drive the lens to move along an optical axis;
   the third magnetic driver group comprises one or more third magnetic drivers each comprising a magnet or a coil;
   the fourth magnetic driver group comprises one or more fourth magnetic drivers each comprising the other of the magnet or the coil forming each of the third magnetic drivers; and
   the first and second magnetic driver groups are electrically isolated from the third and fourth magnetic driver groups.

* * * * *